Aug. 24, 1943.
R. A. WARNER
2,327,833
VOLT AMPERE MEASUREMENT REGULATOR
Filed Oct. 27, 1942
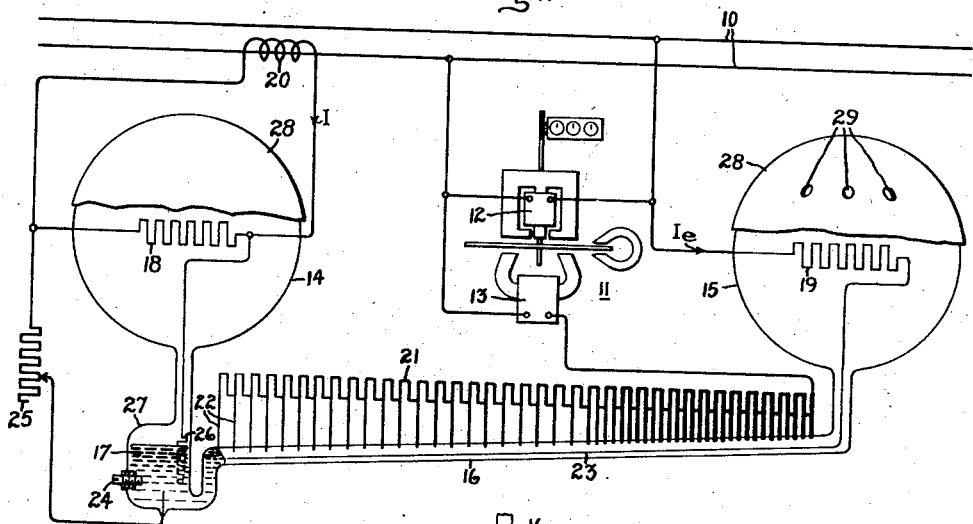
Fig.1.
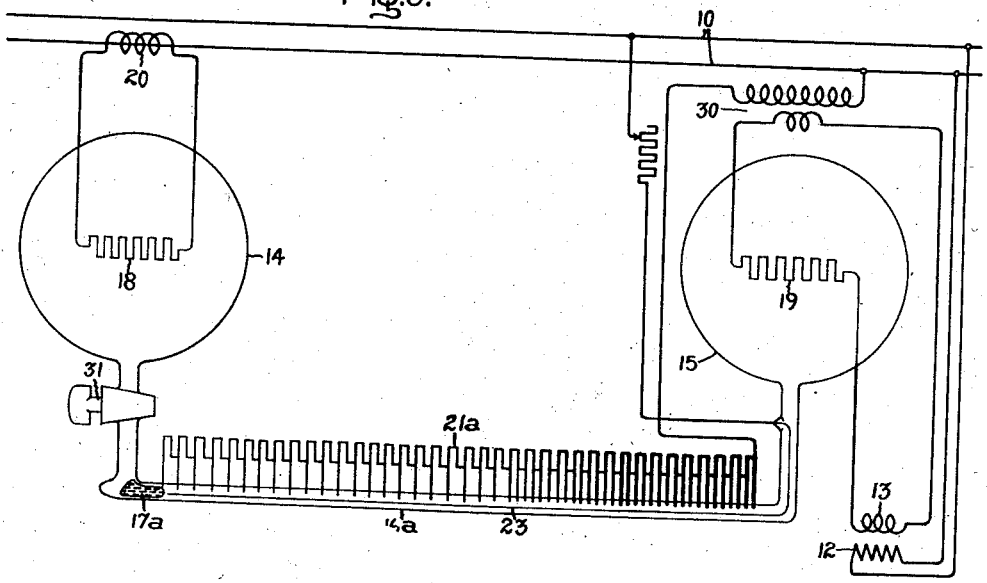
Fig.2.
Fig.3.
Inventor:
Russell A. Warner,
by Harry E. Dunham
His Attorney.

Patented Aug. 24, 1943

2,327,833

UNITED STATES PATENT OFFICE 2,327,833

VOLT AMPERE MEASUREMENT REGULATOR

Russell A. Warner, Schenectady, N. Y., assignor to General Electric Company, a corporation of New York Application October 27, 1942, Serial No. 463,493

5 Claims. (Cl. 171—95)

My invention relates to the measurement of alternating current volt amperes and its primary object is to provide a relatively inexpensive regulating apparatus for use with metering apparatus by means of which volt ampere measurements which are independent of power factor variations may be obtained.

The features of my invention which are believed to be novel and patentable will be pointed out in the claims apprended hereto. For a better understanding of my invention reference is made in the following description to the accompanying drawing in which Fig. 1 represents an induction meter of the watthour type combined with a thermally operated resistance regulator by means of which a current proportional to line current but in phase with the line voltage is obtained for energizing the current coil of the meter. Fig. 2 represents a fragmentary view pertaining to Fig. 1 illustrating a calibrating feature and Fig. 3 shows a modification of the apparatus of Fig. 1.

In Fig. 1, 10 represents an alternating current power line and 11 a meter of a construction similar to that of a conventional alternating induction watthour meter having a voltage coil 12 and a current coil 13. The voltage coil 12 is energized in the usual way from the voltage of power line 10. The current coil 13 is energized from the line voltage by a current which is in fixed phase relation to the voltage of line 10 but which is proportional to the line current thereof. Hence the meter will measure voltampere hours rather than watthours. The important feature of the invention relates to the regulator for controlling the flow of current in coil 13. Such regulator comprises a hermetically sealed vessel having two gaseous expansion chambers 14 and 15 connected by a U tube 16 in which there is a heavy conducting liquid such as mercury forming a liquid seal between the expansion chambers and which therefore takes a position in the U tube dependent upon the gaseous pressure relation between two expansion chambers.

Except for minor differences desirable for compensation, the two expansion chambers are of the same size, contain similar electric resistant heater elements 18 and 19 and have similar heat loss and heat storage characteristics. Heater 18 is energized from a current transformer 20 connected in the power line and the heating of chamber 14 is therefore proportional to $I^2R$ where I is the current of the power line and R the resistance of heater 18.

Heater 19 is heated by a current derived from the voltage of the power line as regulated by a suitably graduated variable resistance 21. Resistance 21 has many taps 22 terminating within and along the sloping U-tube portion 16. Such tube also contains a terminal wire 23 such that when the mercury flows upward along the sloping portion of the U-tube 16 connection is made between the various taps 22 and the wire 16 to complete the circuit and vary the resistance 21 included in the circuit. Such circuit is as follows: from upper line conductor 10 to resistance 19, wire 23, taps 22, resistance 21, coil 13, back to lower conductor of line 10. It is noted that the variable portion of the resistance in the circuit just described is external to the expansion chamber 15 and the connected portion thereof in U tube 16. Hence the variable heat loss in resistance 21 does not influence the operation of the regulator. Hence the heating of expansion chamber 15 is proportional to $I_e^2 R_1$ where Ie is the current through heater 19 and $R_1$ its resistance. By making resistances 18 and 19 similar and the thermal characteristics of the chambers 14 and 15 similar it follows that the heating of both chambers will be equal when $I=Ie$, for any value of I. The regulator is adjusted for operation as follows: The gas pressure in the two chambers is made equal or substantially equal when the two chambers are at the same temperature and the mercury stands at the level shown where the mercury is just out of contact with the left-hand end of the conductor 23. This will be the no-current condition of the device when the line current of power circuit 10 is zero. I preferably so shape the enlarged mercury well part 27 of the vessel that by turning the vessel into the position indicated in Fig. 2 the pressure in the two chambers 14 and 15 may be equalized under similar temperature conditions and when turned back to the position shown in Fig. 1 the pressure in the two chambers will be substantially similar and the mercury will stand as there indicated. Minor adjustments for obtaining this condition may be had by a slight heating of one chamber while in the position of Fig. 2 and adjusting the mercury level by a filling and displacement plug 24 in the mercury well and by adjusting the relative slope of tube 16, when brought back to operating position.

Now, when current flows in heater 18, the mercury at 17 will be forced up the tube 16 towards chamber 15 by reason of the heating and pressure increase of the gas in chamber 14. This will first close the circuit of heater 19 and then cut out resistance 21 in such circuit, until the heating in chamber 15 equals that in chamber 14 to prevent any further rise of the mercury along tube 16. Such condition will exist when I and Ie are substantially equal and variation in I will produce a prompt and corresponding variation in Ie to maintain the two currents equal.

Thus meter 11 has its current coil energized by a current proportional to the current of line 10 but in a fixed phase relation with the line voltage and hence will when calibrated with the regulator measure volt-ampere hours. The wattmeter type measuring device at 11 may, of course, be of the indicating, recording, demand, or relay type.

Owing to the fact that it will require a slightly greater pressure in chamber 14 than in chamber 15 and hence a slightly higher temperature in the chamber 14 to maintain the level of the mercury for a load condition than for a no-load condition and this pressure difference will increase with increase in load current, the device may need to have some compensation to correct for the error that would otherwise result. The error, however, may be kept small by making the volume of chambers 14 and 15 large with respect to the volume of tubular part 16 so that there is little change in gas volume on either side of the mercury seal with changes in mercury level, also, keeping the slope of tubular part 16 small so that there is little actual lifting of the mercury. The differential energy necessary for the controlling action is proportional to the difference between the heating energy of the two chambers, thus $I^2R - I^2eR_2$. If these factors $I^2R$ and $I^2eR_1$ are kept large in comparison to the difference necessary to operate the regulator as is provided for in the design disclosed, these factors and their components may be nearly equal and the error introduced by the regulating energy made very small or negligible.

The device, however, is readily adapted for various compensation expedients to correct for any such error. For example, I have shown a high resistance shunt circuit across resistance 18 which includes a manually adjustable resistance 25 and a resistance 26 which varies with mercury level. It is seen that with a rise in load current and a lowering of the mercury level in well 27, resistance 26 will be increased to allow more of the line current to flow through heater 18. Hence the current in heater 18 may be caused to rise very slightly in proportion to the actual line current with increase in load to the extent necessary to compensate for the error mentioned. Instead of, or in addition to, such compensation I may cause the heat loss of chamber 15 to be slightly greater than that of chamber 14 by varying the amount of insulation on the chambers. Thus, if the chambers are covered with heat insulating material such as represented at 28, I may provide openings 29 in the insulation of chamber 15 to make such chamber less efficient as compared to chamber 14 to the extent necessary for compensation. Then with increasing loads and heating the added increment in current in resistor 19 necessary to maintain balanced condition may be made equal to the added increment in current in resistor 18 required to lift the mercury to maintain the balanced regulating condition desired. Again, I may make heater resistance 18 of a material having a slightly greater positive coefficient of resistance than that of heater 19 so that the $I^2R$ of chamber 14 will become $I^2(R+r)$ with increase in load where $r$ is the variable difference between the resistances of heaters 18 and 19 under load conditions and increases with load. $I^2r$ is then the loss required to lift the mercury and $I=Ie$. I may also provide for a small heat loss in terminal wire 23 which will contribute to the heating of chamber 15 and will decrease in proportion with rise in load. In some cases it may be that coil 13 of meter 11 will have appreciable reactance as compared to its resistance which condition is generally unnecessary and undesirable because I propose to use an ordinary wattmeter element at 11. However, in such a case the decrease in the resistance 21 with increase in load will cause the power factor of this current to decrease slightly. The compensating features above mentioned may also be used to correct for such a condition. Also the corrections may be made in the calibration of the meter. There will be a slight expansion of the mercury as temperature conditions increase, which will tend to offset the type of errors mentioned. Ordinary voltage variations will not require compensation with this form of regulator since an increase in voltage will merely require the mercury to move to a slightly lower level to maintain balanced conditions where $I=Ie$.

The device is inherently self-compensated for changes in ambient temperature as such changes will influence both chambers 14 and 15 alike. The vessel comprising the chambers 14 and 15 and the connecting U tube may be made out of any material suitable for the pressures and temperatures involved. Glass may be used but a less fragile material may be desirable. There will be some slight lag in the response of the regulator but this will not influence the metering accuracy. Hunting may be suppressed by restricting the size of the tubular connection 16 at one or more points. If the resistance 21 be made of a material having a high positive temperature coefficient of resistance such as iron it will also tend to reduce hunting. However, minor hunting will not be objectionable since the average current in heater 19 will correspond to the average current in heater 18. The mercury can rise and fall between two adjacent contacts 22 and corresponding resistance regulating steps to maintain an average desired regulated current proportional to the current in line 10 within a very close approximation. Calibration of the apparatus should take into consideration both rising and falling current conditions.

In Fig. 3 I have shown a modification of the device of Fig. 1. The essential difference is in the use of less mercury and a level or substantially level U-type section 16a. Surface tension is depended upon to keep the mercury globule 17a in a bunched condition necessary to form a seal between the vessels. This form will require very little pressure difference between the chambers to perform the necessary regulation. Also, in Fig. 3 I have provided a step-down transformer 30. The variable resistance 21a is contained in the primary circuit and the heater 19 and meter coil 13 in the secondary circuit. Some compensation for power factor variation in the circuit of the primary of transformer 30 may be desirable and may be had by providing some resistance and heating in the terminal wire 23 the effective length of which varies with load. I have shown a valve at 31 by means of which the gas opening from chamber 14 may be restricted and varied. The gas used in the chambers is preferably a gas which is inert to the mercury and circuit elements with which it comes in contact. Regulators of the form described are relatively inexpensive and by careful design and compensation should produce accurate regulating results over a limited load range.

What I claim as new and desire to secure by Letters Patent of the United States is:

1. In a voltampere measuring system a regulator for obtaining a current proportional to another current comprising a sealed vessel having two gaseous expansion chambers connected by a U tube, the two chambers being normally sealed from each other by a heavy liquid conductor contained in the U tube, said expansion chambers being of substantially the same size and having substantially similar heat loss characteristics and containing substantially similar electric heaters, whereby when energized by substantially equal currents they produce substantially equal pressures on the liquid seal, a resistance external to the vessel but connected to the interior of the U tube by numerous tap connectors, and means connecting one of said heaters in an electric circuit in series with said resistance and liquid conductor whereby variation in the position of the liquid conductor in the U tube varies said resistance and the current flow in the heater connected in series therewith, an increase of current through the heater connected in series with said resistance producing a pressure on said liquid seal which tends to move it in a direction to decrease such current.

2. In a voltampere measureing system for alternating current power circuits, a regulator for obtaining a current proportional to the line current but in substantially fixed phase relation to the voltage of the power circuit comprising a sealed vessel having two substantially similar gaseous expansion chambers and connected by a U tube of small capacity as compared to the capacity of the expansion chambers, a heavy liquid conductor contained in the U tube and serving to normally seal one gaseous chamber from the other, said U tube having a horizontally disposed section along which the liquid conductor may be moved in response to the differential pressure in the expansion chambers, substantially similar electric heaters for said expansion chambers, connections for energizing one heater in response to the current of the power circuit, connections for energizing the other heater from the voltage of the power circuit and a variable resistance external to said vessel but connected in series with the last mentioned heater and variable in response to the movement of the liquid conductor along said U tube to maintain the heating current in the two heaters substantially equal.

3. In a measuring system, a regulator for obtaining a current equal to another current comprising a pair of substantially similar thermal responsive devices, connections for electrically energizing said devices with heating currents, current regulating means operated in response to the differential action of said thermal devices for controlling the energizing current of one of said thermal devices in a direction tending to equalize the energizing currents of said devices and means for modifying the joint controlling action of said devices to compensate for the difference in the thermal responsive action of said devices necessary to operate such regulator so that the average energizing currents of said devices will be equal.

4. In a measuring system, a regulator for producing a current equal to another current comprising a pair of thermal devices having substantially similar heat storage and loss characteristics, substantially similar electric resistance heaters for said devices, electric circuit connections for energizing said heaters, means operated by the differential action of said devices for controlling the energizing current for one of said devices, said regulator operating in a direction tending to maintain the regulated current equal to the current in the other device, the heating energy of said devices being large in comparison to the differential energy necessary for the controlling action whereby the heating energies of said devices and the heating currents of said devices are approximately equal, said regulator also being compensated to cause the energizing currents to be equal.

5. In a measuring system a current regulator comprising a pair of gaseous expansion chambers connected by a U tube below the level of the chambers and having a regulating portion which is approximately horizontal when the regulator is in its regulating position, an enlarged well portion in the U tube at one end of the regulating portion, a heavy liquid conductor contained in such well and comprising a liquid seal between the chambers when the regulator is in regulating position, said liquid being adapted to be forced from the well along the regulating portion of the U tube for regulating purposes by differential pressure variations in said chambers, said well being of such capacity, shape and disposition in the U tube that the regulator may be tipped to a non-operating position to break the liquid seal between the gaseous chambers for the purpose of equalizing the gaseous pressures in said chambers and then returned to regulating position to reestablish such seal with negligible change in the equalized pressure condition.

RUSSELL A. WARNER.